United States Patent
Vigilante, Jr.

[11] Patent Number: 6,082,802
[45] Date of Patent: Jul. 4, 2000

[54] UNDER REAR SEAT OF PICKUP TRUCK STORAGE

[76] Inventor: Antonio Vigilante, Jr., 910 Jones St., Clearwater, Fla. 33755

[21] Appl. No.: 09/067,479

[22] Filed: Apr. 27, 1998

[51] Int. Cl.[7] .................................................. B60N 3/12
[52] U.S. Cl. ................... 296/37.15; 296/37.1; 296/37.6; 296/37.16
[58] Field of Search ............... 296/37.15, 37.16, 296/37.1, 37.6, 65.05; 297/188.09, 188.08, 188.1, 14; 224/275

[56] References Cited

U.S. PATENT DOCUMENTS

| | | | |
|---|---|---|---|
| 1,668,386 | 5/1928 | Talbott | 297/14 |
| 3,131,813 | 5/1964 | Jensen | 224/275 |
| 3,326,596 | 6/1967 | Spina | 296/37.16 |
| 4,682,438 | 7/1987 | Arrow | 297/14 |
| 5,161,855 | 11/1992 | Harmon | 297/238 |
| 5,169,200 | 12/1992 | Pugh | 296/37.6 |
| 5,597,201 | 1/1997 | Hinze | 297/188.1 |
| 5,667,115 | 9/1997 | Verhaeg | 224/275 |

*Primary Examiner*—D. Glenn Dayoan
*Assistant Examiner*—Lori L Coletta
*Attorney, Agent, or Firm*—Harold D. Shall

[57] ABSTRACT

A storage area under the raisable rear seat of an extended cab of a pickup truck with the sidewalls of the cab forming the sides of the storage area, the back of the cab forming the back of the area, the bottom of the rear seat forming the top of the area, the floor at the bottom of the cab forming the bottom of the area and a removable panel forms the front wall. The sides of the removable panel being carried by braces which are in turn carried by the side walls and attached thereto by VELCRO.

1 Claim, 2 Drawing Sheets

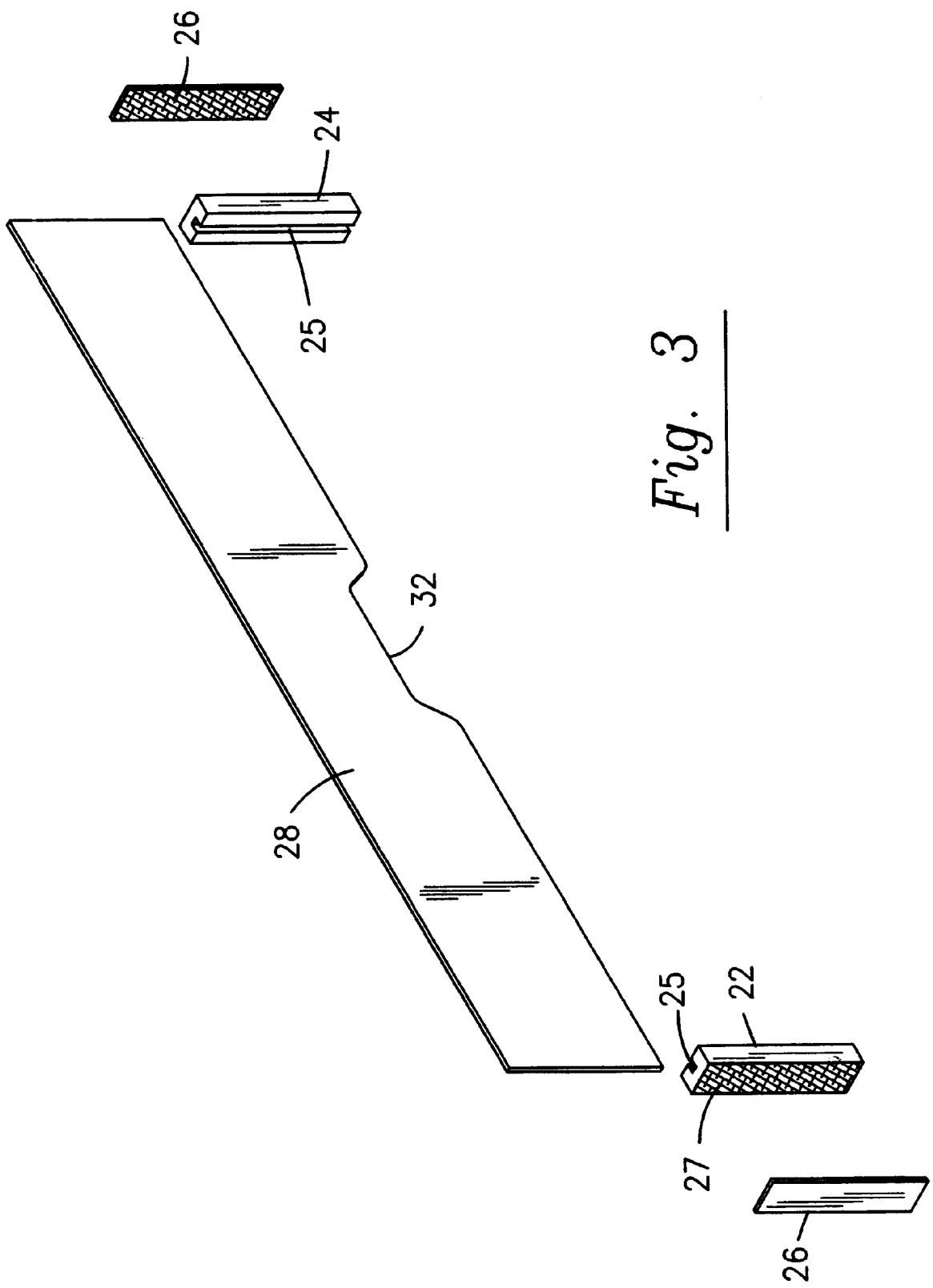

UNDER REAR SEAT OF PICKUP TRUCK STORAGE

BACKGROUND OF THE INVENTION

1. Field of the Invention

This invention relates to storage space in pickup trucks with extended cabs having a foldable rear seat and more particularly to a structure which cooperates with the rear seat to form a storage area when the seat is down, which will keep its structural integrity when the seat is up and can be easily removed if desired.

2. Description of the Prior Art

Storage spaces in the rear seat area of extended cab pickup trucks is well known in the art. For example, U.S. Pat. No. 5,667,115 discloses a "Vehicle Interior Storage Container", however such container does not disclose the parameters of my invention. U.S. Pat. Nos. 5,597,201, 3,326,596 and 3,131,813 also discloses a storage seat; however, here the seat, the walls and the floor of the containers are separate structures from the vehicle cab.

SUMMARY OF THE INVENTION

It is an object of this invention to provide a simple storage area under the foldable rear seat of an extended cab pick up which area uses the seat underside to form the top of the area, the side walls of the cab form the side walls of the area, the back of the cab forms the back of the area and a removable panel is secured to the side walls at the front of the seat by an easily removed and installed device thereby forming the front wall of the area.

BRIEF DESCRIPTION OF THE DRAWINGS

FIG. 3 a perspective view of the front panel of the created storage area and also showing the removable mounting means therefor.

DETAILED DESCRIPTION OF THE PREFERRED EMBODIMENT

Figure 1:
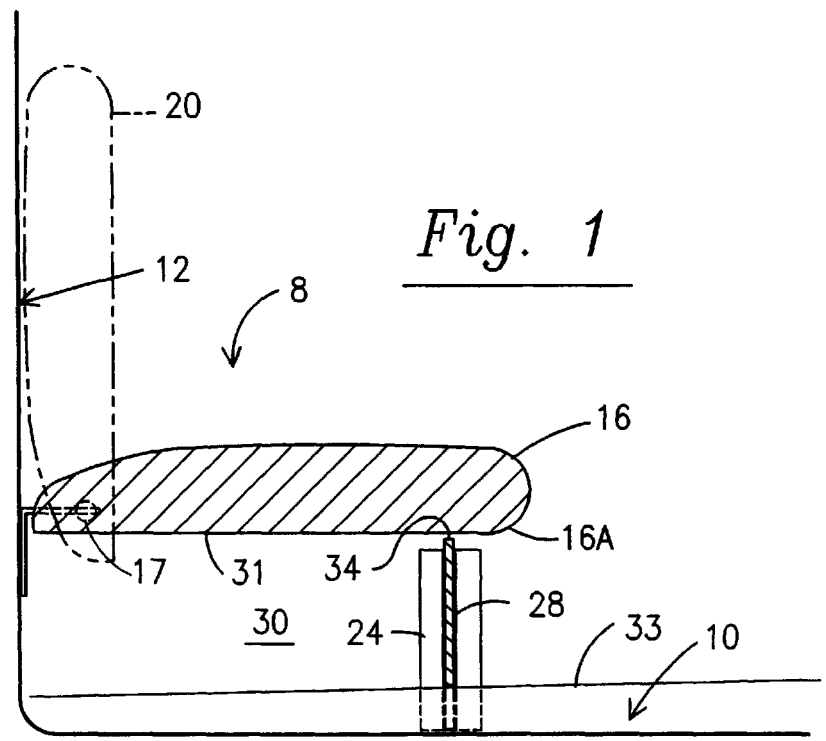
FIG. 1 is a longitudinal view of the rear seat of an extended cab pickup truck.

Referring now to the drawings, a fragmentary view of an extended cab pickup is shown generally at 8, the floor is shown generally at 10; the back is shown generally at 12 and one of the sides is show generally at 14.

The folding rear seat is shown at 16 and is foldable from a vertical position, as shown in dotted lines at 20, to its normal horizontal position wherein it can be sat upon. A hinge member 17 connects the rearward bottom of the back 12 to the cab.

A pair of side braces 22 and 24 each has a vertical slot 25 formed medially therein, which slot, when the braces are installed in the vehicle, face each other and the centerline of the vehicle. A pair of VELCRO strips 26 are secured, as by conventional bonding to the sides 14 of the vehicle 8 in an opposed relationship and just rearwardly of the front edge 16A of the seat 16. Each of the braces 22 and 24 have a cooperating VELCRO strip 27 secured to the laterally outward side thereof for cooperation with the strips 26.

Figure 2:
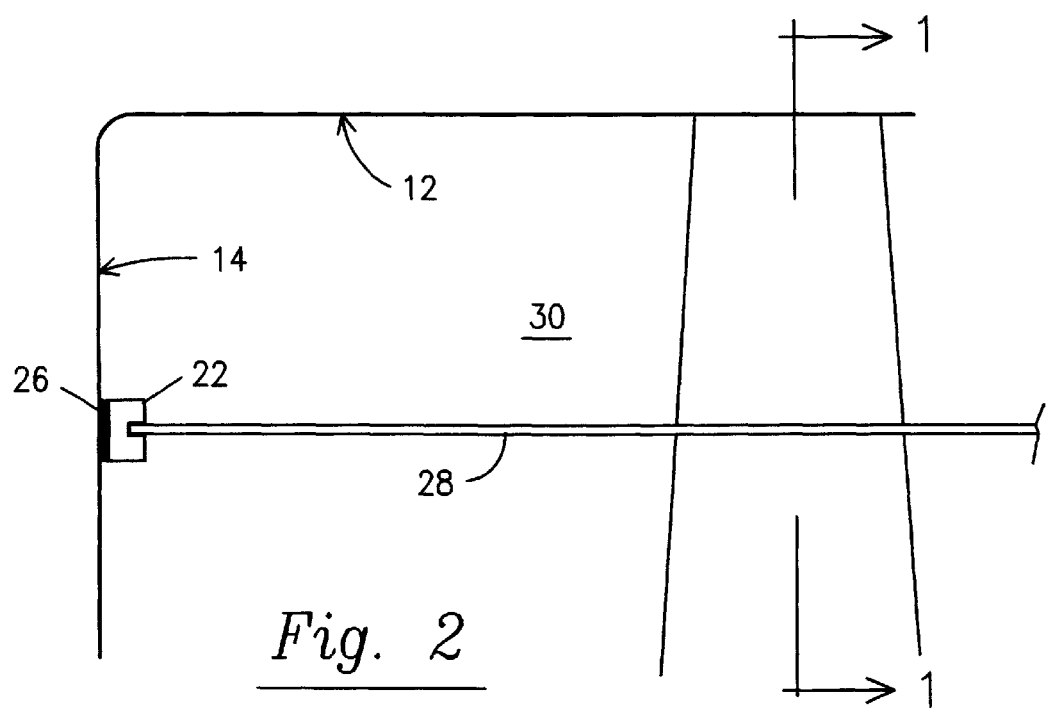
FIG. 2 is a plan view of the structure of FIG. 1 with the seat removed so that the inside of the storage area can easily be seen.

A removable and installable front wall 28, when installed in its position shown in FIGS. 1 and 2, forms a storage area 30 in conjunction with the side walls 14, the rear wall 12, and the bottom 31 of the rear seat 16. The front wall 28 fits within the vertical slots 25 in the side braces 22 and 24, and a relief 32 is formed medially in the bottom of the front wall to accommodate the "drive line hump" 33 formed in the floor of the cab. The top 34 of the wall 28 engages the bottom front of the seat 16 and encloses the area 30.

The side braces 22 and 24 can easily be installed on the VELCRO (hook and pile fastener) 26 and 27, and also can be easily removed. Such can be done as an original equipment part or as an aftermarket add on. With the braces 22 and 24 installed, the wall 28 can easily be installed by raising the seat 16 and sliding the front wall 28 into the slot 25 of the braces 22 and 24 so that the wall 28 rests on the floor 10 of the truck 8, and when removal of the storage area 30 is desired, the front wall 28 can easily be removed as can the braces 22 and 24. With the front wall 28 in place, the seat 16 can be lowered thereon to enclose the space. Access to the area 30 can be had by raising the seat 16.

While only a single embodiment is shown and described, it is apparent that changes can be made therein without departing from the scope of this invention as defined by the following claims.

What is claimed is:

1. A storage container forming a storage area under the raisable rear seat of an extended cab pickup truck having opposed cab side walls, a cab floor and a cab inner rear wall, said storage container having a front wall and wherein the opposed side walls of the cab form the opposed side walls of the storage container, the cab inner rear wall forms the rear wall of said storage container, the floor of the pickup forms the bottom of said storage container, and the rear seat of the cab forms the top wall of said storage container, characterized in that, a) removable and installable brace means are carried by said side walls of the cab and secured thereto by releaseable securing means, b) said front wall is removeably installable and secured to said opposed side walls of the cab by said brace means, and has a bottom resting on the bottom of said cab and has a top disposed under and supporting said rear seat, c) and being further characterized in that said brace means are vertically elongated with one of the said brace means having the outer lateral side thereof secured to said one side wall of the cab and the other of said brace means having the outer lateral side thereof secured to said side wall on the opposite side of the cab, both said brace means having vertical slots therein with the slots being in opposed relationship, and said front wall is received in the vertical slots of said brace means, and said releaseable securing means are hook and pile fastener means securing said brace means to the side walls of the cab, said hook and pile fastener means includes a pair of first hook and pile fastener strips with one of said first hook and pile fastener strips being bondingly secured to the outer lateral side of each of said brace means and a second hook and pile fastener strip engageably securable to each of said first hook and pile fastener strips with each of said second hook and pile fastener strips being bondingly secured to the inner side of said cab side walls.

* * * * *